US009244955B1

(12) United States Patent
Esposito (10) Patent No.: US 9,244,955 B1
(45) Date of Patent: Jan. 26, 2016

(54) METHODS AND APPARATUS FOR GENERATING A DATABASE LAYOUT

(71) Applicant: EMC Corporation, Hopkinton, MA (US)

(72) Inventor: Jeffrey Daniel Esposito, North Kingstown, RI (US)

(73) Assignee: EMC Corporation, Hopkinton, MA (US)

( * ) Notice: Subject to any disclaimer, the term of this patent is extended or adjusted under 35 U.S.C. 154(b) by 536 days.

(21) Appl. No.: 13/630,266

(22) Filed: Sep. 28, 2012

(51) Int. Cl.
*G06F 17/30* (2006.01)
*G06F 11/34* (2006.01)

(52) U.S. Cl.
CPC ...... *G06F 17/30294* (2013.01); *G06F 11/3457* (2013.01)

(58) Field of Classification Search
None
See application file for complete search history.

(56) References Cited

U.S. PATENT DOCUMENTS

| | | | |
|---|---|---|---|
| 6,223,171 B1 * | 4/2001 | Chaudhuri | G06F 11/3447 707/718 |
| 6,766,325 B1 * | 7/2004 | Pasumansky | G06F 17/30554 |
| 7,805,443 B2 * | 9/2010 | Konig | G06F 17/30306 707/736 |
| 7,831,325 B1 * | 11/2010 | Zhang et al. | 700/108 |
| 8,156,281 B1 * | 4/2012 | Grosner et al. | 711/114 |
| 8,255,803 B1 * | 8/2012 | McAdam et al. | 715/735 |
| 8,843,459 B1 * | 9/2014 | Aston et al. | 707/694 |
| 2004/0220942 A1 * | 11/2004 | Agrawal et al. | 707/100 |
| 2005/0222885 A1 * | 10/2005 | Chen et al. | 705/8 |
| 2006/0184338 A1 * | 8/2006 | Lightstone | G06F 11/3447 702/182 |
| 2010/0114976 A1 * | 5/2010 | Castellanos | G06F 17/30312 707/803 |
| 2010/0318543 A1 * | 12/2010 | Chaudhuri | G06F 17/30306 707/759 |
| 2011/0179384 A1 * | 7/2011 | Worner et al. | 715/810 |
| 2011/0246526 A1 * | 10/2011 | Finkelstein et al. | 707/784 |
| 2012/0017046 A1 * | 1/2012 | Mehta et al. | 711/118 |
| 2012/0059803 A1 * | 3/2012 | Nagpal et al. | 707/691 |
| 2012/0109936 A1 * | 5/2012 | Zhang et al. | 707/713 |

* cited by examiner

*Primary Examiner* — Richard Bowen
(74) *Attorney, Agent, or Firm* — Ryan, Mason & Lewis, LLP

(57) ABSTRACT

Methods and apparatus are provided for generating a database layout. A layout for a database is generated by receiving a user specification of a database vendor, purpose and environment for the database; receiving a user configuration of layout options for the database in a context of the given database vendor and purpose and for an indicated protection type; receiving a user selection of a storage profile for the database; and determining a correct size and product model for storing the database with the configured layout based on a quantitative profile factor assigned to the database vendor, purpose and environment and a quantitative layout factor assigned to the protection type. The quantitative profile factor can be based on a target layout complexity factor. The quantitative layout factor can be based on whether specified file types need to be stored on one or more tiers of a tiered storage system.

25 Claims, 6 Drawing Sheets

300 — IF this option is selected...

| | Then | Why |
|---|---|---|
| ASM | Implement Powerpath | AMS does not provide multi-pathing, but does leverage multipathing tools |
| | Review Joint engineering white paper (oracle/EMC) | Specific recommendations for clusters, LUN to disk group ratios |
| | Use external redundancy disk groups | offloading redundancy protection increases HOST CPU availability to DB processes |
| | Consider "Double Striping" | ASM provides distribution of I/O server side while striped metavolumes distributes I/O storage side |
| RAC | Install powerpath on all cluster nodes, ensuring the same configuration files are on all nodes | Consistency of discovery strings for all related instances in a cluster |
| OLTP (High writes/transactions) | control files on RAID 0+1 or RAID 5 | |
| | database files on RAID 0+1 | Avoids hot spots and gives the best possible perf during disk failure |
| | Redo log on RAID 1 | |
| | Archive log on RAID 1 | |
| DataMart (heavy reads/ad-hoc) | control files on RAID 0+1 or RAID 5 | Comparable performance in ad-hoc reads for less customer expense |
| | database files on RAID 5 | |
| | Redo log on RAID 1 | |
| | Archive log on RAID 1 | |
| General rule of thumb | Always confirm that datafiles are less then 10ms access in test environment | |
| | Always confirm performance via relevant throughput benchmarks | |

310

| General Oracle file name conventions by file type | Resulting General directory/name convention |
|---|---|
| control | /aaa/bbb/ccc/control.ctl |
| redo | /aaa/bbb/ccc/redo.xx.log |
| Required Tablespace Name | |
| sysaux | /aaa/bbb/ccc/sysaux.dbf |
| system | /aaa/bbb/ccc/system.dbf |
| undo | /aaa/bbb/ccc/undo.dbf |
| temp | /aaa/bbb/ccc/temp.dbf |

| Oracle Versions | DB Types | Home/Base directories |
|---|---|---|
| | OLTP (High writes/transactions) | /app/oracle/product/ |
| | DataMart (Heavy reads/ad hoc queries) | /app/oracle/ |
| 9i | | |
| 10g | Hybrid (OLTP with ad hoc queries) | /app/oracle/product/11.1.0/ |
| 11g | SAP OLTP | /app/11.1.0/crs/ |

| OS Mount Point | Of A File Name | Tier | RAID Protection | Viable RAID type |
|---|---|---|---|---|
| /u02 | Tablespaces /u02/app/oracle/oradata/DMdb01/sysaux.dbf /app/oracle/oradata/DMdb01/system.dbf | XYZ123 XYZ123 | XYZ123 XYZ123 | database files on RAID 0+1 Avoids hot spots and gives the best possible perf during disk failure |
| | /app/oracle/oradata/DMdb01/temp.dbf /app/oracle/oradata/DMdb01/undotbs.dbf /app/oracle/oradata/DMdb01/MyINDEX.dbf /app/oracle/oradata/DMdb01/MyTABLES.dbf | XYZ123 XYZ123 XYZ123 XYZ123 | XYZ123 XYZ123 XYZ123 XYZ123 | |
| | Control File(s) /app/oracle/ORADATA/DMdb01/control.ctl | | | control files on RAID 0+1 or RAID 5 |
| | Redo Logs (9) so XX would be 01..9 /app/oracle/ORADATA/DMdb01/redoXX.log | | | Redo log on RAID 1 |
| | Diagnostic Data based on 11g Locations (ADR_HOME)/trace/ (ADR_HOME)/trace/ (ADR_HOME)/alert/ (ADR_HOME)/incident/in/ (ADR_HOME)/incident/in/ | | | Diag. Data locale contains: Foreground process traces Background process traces Alert log data Core dump Incident dumps/trace files |

610 — OS Mount Point; 620 — Of A File Name; 630 — Tier; 640 — RAID Protection; 650 — Viable RAID type; 600 — table

US 9,244,955 B1

METHODS AND APPARATUS FOR GENERATING A DATABASE LAYOUT

FIELD OF THE INVENTION

The present invention relates generally to techniques for database layout generation.

BACKGROUND OF THE INVENTION

Database modeling and design is an important part of database management and performance. Nonetheless, there is currently no mechanism for implementing proven storage-optimized database layout methodology consistently in business data environments. Enterprises make substantial investments in databases and associated storage for critical enterprise data. The database layout, however, is typically designed with little, if any, consideration of how to make the best use of the storage when preparing the database layout. Each database is typically designed independently based on the subject matter knowledge, experience, and beliefs of any given database administrator, database architect and storage administrator.

The performance, throughput, and support challenges resulting from an initial misalignment between data layout and optimized storage are an accepted price of doing business in database technologies. Subsequent adjustments to data layout, however, can be costly, although there are tools available to assist with downstream storage/data layout alignment.

Given the significant investment of time and money attributed to storage infrastructure and databases in an enterprise setting, a need exists for improved methods and apparatus for generating a database layout that employs encapsulated approaches to data layout on storage.

SUMMARY OF THE INVENTION

The present invention in the illustrative embodiments described herein provides methods and apparatus for generating a database layout. In accordance with an aspect of the invention, a layout for a database is generated by receiving a user specification of a database vendor, purpose and environment for the database; receiving a user configuration of layout options for the database in a context of the given database vendor and purpose and for an indicated protection type; receiving a user selection of a storage profile for the database; and determining a correct size and product model for storing the database with the configured layout based on a quantitative profile factor assigned to the database vendor, purpose and environment and a quantitative layout factor assigned to the protection type. The quantitative profile factor can be based on a target layout complexity factor. The quantitative layout factor can be based on whether specified file types need to be stored on one or more tiers of a tiered storage system.

According to further aspects of the invention, one or more templates can be generated based on the configured layout and optionally stored in a template library. The user configuration of layout options is optionally guided by one or more rule-based best practices. The configured layout is optionally scrubbed against rule-based best practices.

The database layout techniques of the illustrative embodiments overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIG. 3 is an interface illustrating a user specification of layout characteristics for the database layout process of FIG. 2;

DETAILED DESCRIPTION

Aspects of the present invention provide improved methods and apparatus for generating a database layout that employ encapsulated approaches to data layout on storage. Methods and apparatus are provided for generating a database layout that plan and model initial database layout mechanics based on database type/array environmental and business requirement characteristics. In one exemplary embodiment, the following characteristics are addressed by the disclosed database layout tool: virtualized storage environments; database purpose, version and, type; RAID (Redundant Array of Independent Disks) protection at the storage tier level; database layout detailing in context for all data and control aspects; initial layout for storage and memory resource alignment to business data priorities; and real-time reactive adjustment to recommendations and layout planning and options based on selections made through the interface interacting with the layout policy engine.

Figure 1:
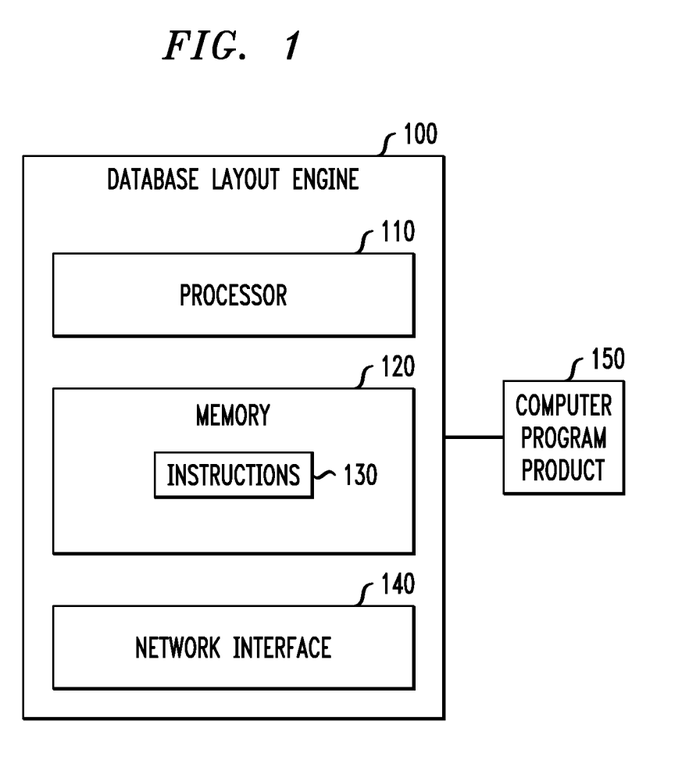
FIG. 1 is a schematic diagram illustrating an exemplary database layout engine.

FIG. 1 is a schematic diagram illustrating an exemplary database layout engine 100. The exemplary database layout engine 100 includes a processor 110, a memory 120 and a network interface 140.

Memory 120 is configured to store data and code which includes instructions 130 to process the database layout process 200, as discussed further below in conjunction with FIG. 2. Memory 120 generally takes the form of, e.g., random access memory, flash memory or a non-volatile memory.

Processor 110 can take the form of, but is not limited to, an Intel™ or AMD™ based MPU, and can be a single or multi-core running single or multiple threads. Processor 110 is coupled to memory 120 and is configured to execute the instructions 130 stored in memory 120.

Network interface 140 is constructed and arranged to send and receive data over a communications medium. A computer program product 150 may optionally store additional instructions.

Figure 2:
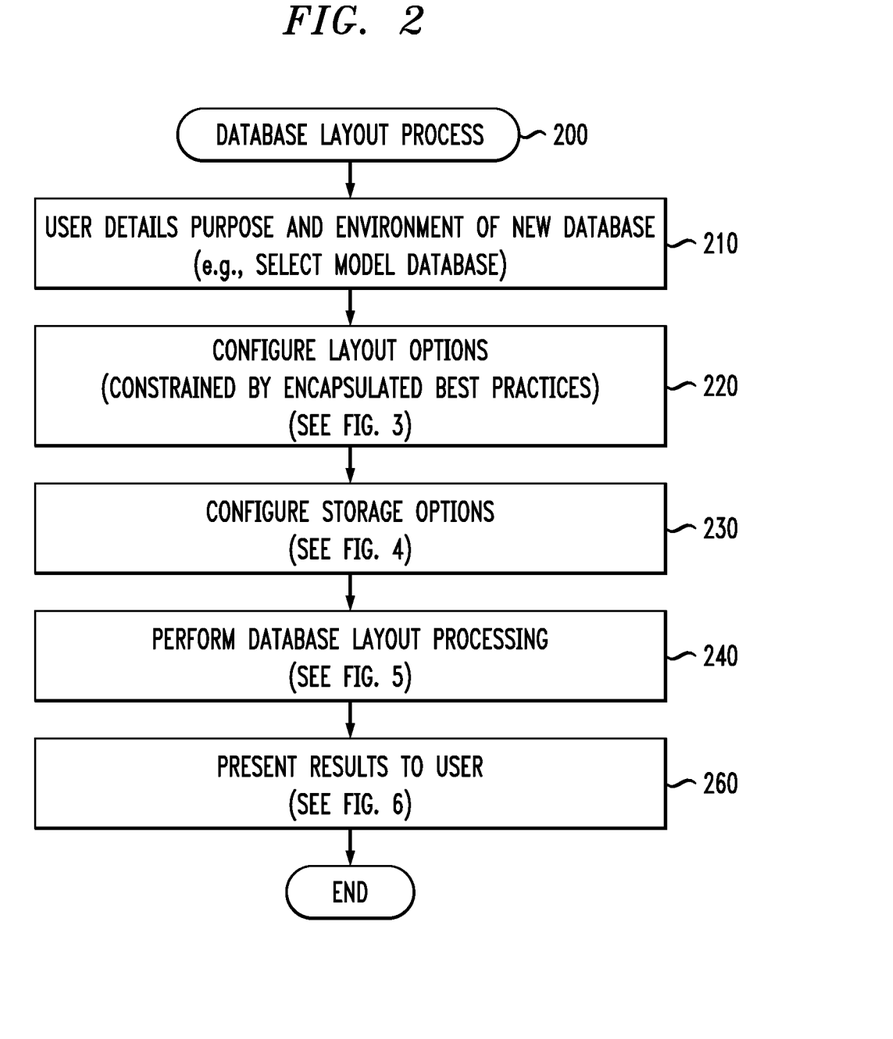
FIG. 2 is a flow chart describing an exemplary implementation of a database layout process incorporating aspects of the present invention.

FIG. 2 is a flow chart describing an exemplary implementation of a database layout process 200 incorporating aspects of the present invention. As shown in FIG. 2, the exemplary database layout process 200 initially details the purpose and environment of the database being designed during step 210. For example, the user can be presented with a list of the existing actual databases of the enterprise for selection. The list of the existing actual databases can optionally present associated performance metrics and/or additional information for each identified database. For example, the user can specify the desired database vendor, such as Oracle® from Oracle Corporation or DB2® from IBM Corporation, and then the user can be presented only with options for the selected vendor. In an exemplary Oracle setting, the user can specify the purpose of the database, such as a single instance database with an Automatic Storage Management (ASM) to manage storage, a Real Application Clusters (RAC) environment, or a Very Large Database (VLDB).

In addition, the interface presented to the user during step 210 can optionally be adjusted for the specific vendor. The user can specify the database environment, such as the database name, service name and service identifier (SID); and indicate the number of control files, number of redo logs, the read and write profile of the database (e.g., heavy reads and/or writes), and the version of the selected database. The interface can optionally enforce any conventions required by the vendor, such as particular naming conventions.

For the selected vendor, the interface can also optionally present the user with typical tablespace notes, which can be supplemented or altered based on the individual preferences of the user.

As discussed further below in conjunction with FIG. 3, the user configures the layout options for the selected database vendor during step 220.

As discussed further below in conjunction with FIG. 4, the user configures the storage options for the selected database vendor during step 230.

As discussed further below in conjunction with FIG. 5, the database layout processing is performed during step 240.

The results are then presented to the user during step 260. An exemplary database layout result is discussed further below in conjunction with FIG. 6.

FIG. 3 is an interface 300 illustrating a user specification of layout characteristics for the database layout process of FIG. 2 (step 220). In the exemplary embodiment of FIG. 3, the database layout configurations and layout recommendations 310 are provided for each selected database vendor (e.g., Oracle), database purpose (e.g., a single instance database with an ASM to manage storage, a RAC environment, or an Online transaction processing (OLTP)) and protection type (e.g., a redundant array of independent disks (RAID)). For example, for an OLTP database, control files are automatically placed on RAID 0+1 or RAID 5 and the redo log file is automatically placed on RAID 1.

In addition, as shown in FIG. 3, additional information 320 (e.g., rules of thumb or things the designer should know about the vendor when performing a database layout) are provided for the database vendor.

Figure 4:
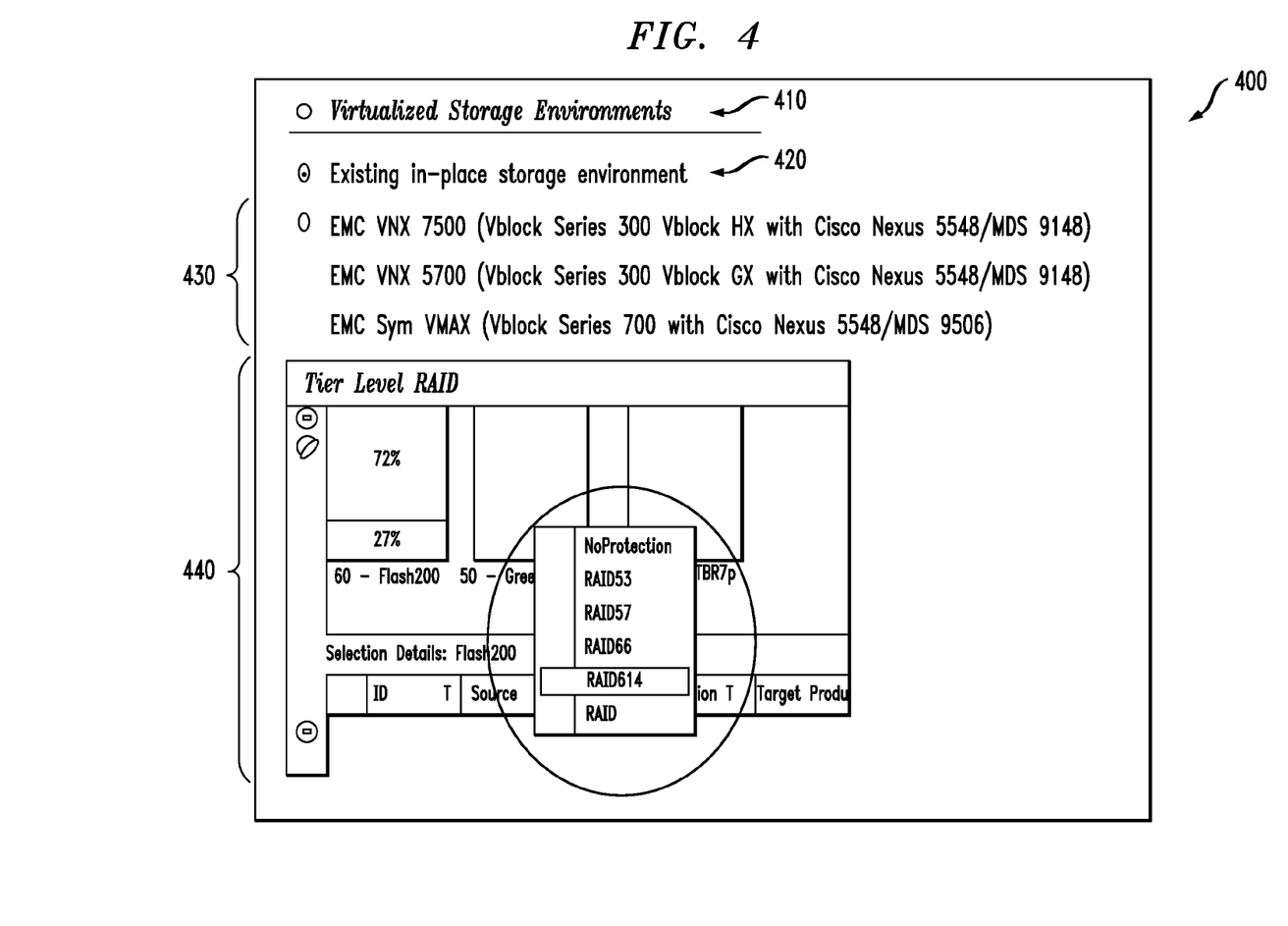
FIG. 4 is an interface illustrating a user specification of storage characteristics for the database layout process of FIG. 2.

FIG. 4 is an interface 400 illustrating a user specification of storage characteristics for the database layout process of FIG. 2 (step 230). Generally, the design uses the interface 400 to select the actual storage environment for the database under design. For example, the user can use a checkbox 410 to specify whether virtualized storage is permitted, and can use checkbox 420 to specify that existing in-place storage should be employed. In addition, if virtualization is permitted, the user can be presented with a list 430 of additional available virtualization storage profiles for selection. In an exemplary embodiment, the user could select from among a Symmetrix® VMAX® commercially available from EMC Corp. and one or more Symmetrix® VNX® storage arrays commercially available from EMC Corp. Thus, the user can be presented with a list of available virtualization storage profiles, optionally with the model information and/or associated performance specifications of each available storage option. In one exemplary embodiment, existing in-place storage of the enterprise can be a default selection.

In addition, as shown in FIG. 4, additional presented information 440 comprises tier level RAID. The user can select a given RAID tier to determine the protection selections within best practice constraints, based on the selected target storage environment.

Figure 5:
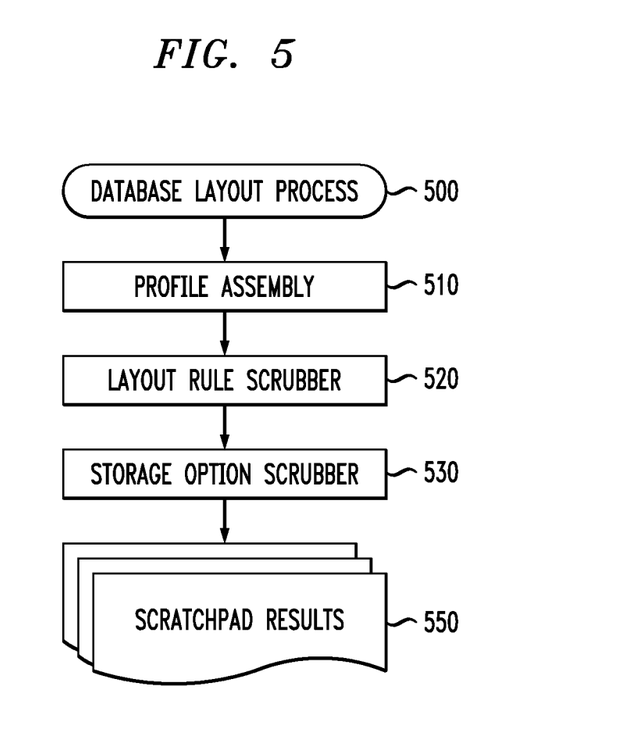
FIG. 5 is a flow chart illustrating additional details of the database layout processing of FIG. 2.

FIG. 5 is a flow chart illustrating additional details 500 of the database layout processing of FIG. 2 (step 240). The exemplary database layout processing process 500 optionally performs a hash check prior to executing to identify invalid and/or unsupported combinations of user selections during steps 210, 220 and 230 of FIG. 2. If an invalid combination is detected, the database layout processing process 500 can provide a notification to the user and stop execution. In addition, the database layout processing process 500 determines a complexity rating for the target layout based on a degree of partial match. For example, if a datafile/tablespace combination is incomplete for the specified database purpose, a rank of 8 out of ten can be established.

As shown in FIG. 5, a profile is assembled during step 510 by constructing an initial database profile from the selected database (step 210) and scrubbing the environmental options. The initial database profile can be constructed from the specified database options by assigning a profile assembly factor based on the user specifications (e.g., database purpose, vendor, cluster, database-side storage management mechanism (ASM, etc.), and operational category (OLTP, etc.), and the determined target layout complexity rating and the user-defined/purposed Tablespace/datafiles.

A quantitative profile factor can be assigned to the database (DB) vendor, purpose and environment. The quantitative profile factor can be based on the determined target layout complexity rating (factor). The Profile Factor (also referred to as the quantitative profile factor) can be computed as follows:

$$\text{Profile Factor} = A + B + C \quad (1)$$

where X=Target Layout complexity rating assigned; A=(DB Purpose(X))(Cluster+X); B=(DB-side storage management mechanism (ASM)) and C=(Operational Category).

In addition, the basic database profile is scrubbed against best practices, for example, using a Btree B-Tree search (for example, shift user defined tablespaces to smallfile if OLTP).

As shown in FIG. 5, a layout rule scrubber is employed during step 520 by applying selected layout configuration options and scrubbing against selected database vendor and encapsulated best practices. A quantitative layout factor can be assigned to the protection type. The quantitative layout factor can be based on whether specified file types need to be stored on one or more tiers of a tiered storage system. Selected layout configuration options can be applied by calculating a layout factor (also referred to as the quantitative layout factor) for a RAID protection scheme by database file component type as follows:

$$\text{Layout Factor} = E + F + G \quad (2)$$

where E=Journaling (Redo Log placement); F=DB Operations (Ops) Control data (Control file); and G=Data Archival (Archive Log).

The layout is then scrubbed against a RAID Ruleset (for example, Redo log is placed on correct RAID protection).

A storage option scrubber is implemented during step 530 to derive the correct storage sizing and model based on the profile and layout factors computed using equations 1 and 2, within the selected storage and RAID protection options.

Thereafter, a database layout profile array can be updated during step 550 with the final database layout. The designer can further analyze the design using the user interface and can optionally save a database layout result set which will then become available as a "database example" as part of the database layout template library used during step 210.

Figure 6:
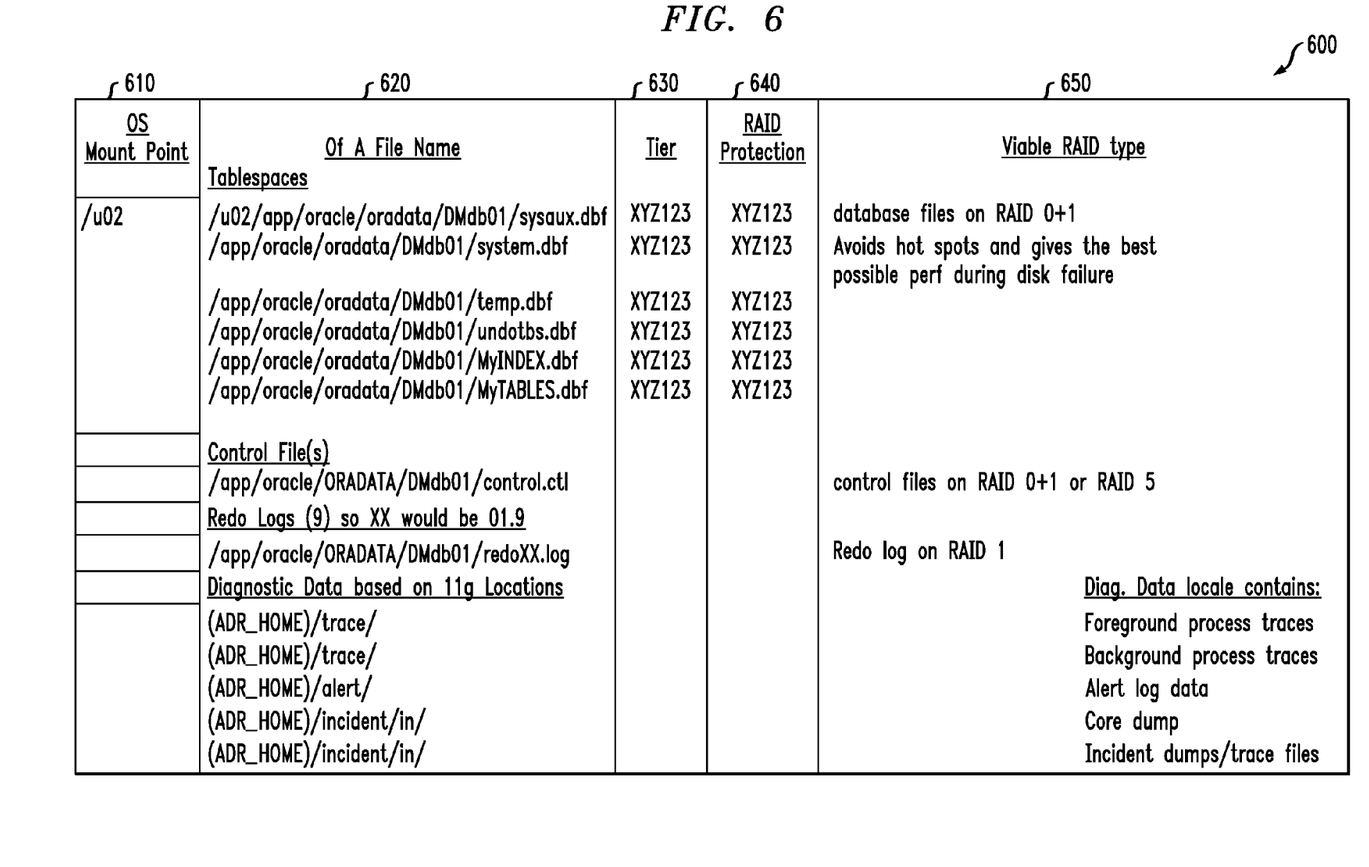
FIG. 6 illustrates an exemplary database layout result.

FIG. 6 illustrates an exemplary database layout result 600. As shown in FIG. 6, the exemplary database layout result 600 indicates the operating system mount point for the database in field 610 and the Optimal Flexible Architecture (OFA) file names in field 620 for tablespaces, control files, redo logs and diagnostic data. The corresponding tier and RAID protection for the tablespaces is provided in fields 630 and 640, respectively. Finally, the viable RAID type for the applicable indicated files is indicated in field 650.

As mentioned previously herein, the above-described embodiments of the invention are presented by way of illustrative example only. Numerous variations and other alternative embodiments may be used. For example, while the exemplary embodiment employs Oracle databases, databases from other vendors can be designed. In addition, the exemplary graphical user interface (GUI) is for illustration purposes and any mechanism for a user to indicate desired selections can be employed.

The illustrative embodiments of the invention as described herein provide improved methods and systems for database layout. It should again be emphasized that the particular embodiments described above are provided by way of illustration, and should not be construed as limiting the present invention to any specific embodiment or group of embodiments. For example, as previously noted, the described embodiments may be adapted in a straightforward manner to operate with other database vendors. Also, the particular configuration of system elements shown in FIG. 1, and their interactions as shown in FIGS. 2 through 5, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for designing a layout for a database, comprising:
   receiving a user specification of a database vendor, a business data purpose and an environment for said database;
   receiving a configured layout from a user comprising a user configuration of layout options for said database to identify a predefined recommended layout for said given database vendor and said business data purpose;
   receiving a user selection of a storage profile for said database;
   comparing said configured layout and said predefined recommended layout to assign a target layout complexity factor indicating a degree of match between said configured layout and said predefined recommended layout;
   determining, using at least one hardware device, a size and a product model for storing said database with said configured layout based on a quantitative profile factor assigned to said database vendor, said business data purpose and said environment by at least one hardware device and a quantitative layout factor assigned to said protection type by at least one hardware device, wherein one or more components of said quantitative profile factor are weighted by said target layout complexity factor; and
   providing said determined size and said determined product model for storing said database with said configured layout.

2. The method of claim 1, wherein said quantitative layout factor is based on whether specified file types need to be stored on one or more tiers of a tiered storage system.

3. The method of claim 1, further comprising the step of presenting said user with results for said determined correct size and product model for storing said database with said configured layout.

4. The method of claim 1, further comprising the step of generating one or more templates based on said configured layout.

5. The method of claim 4, further comprising the step of storing one or more of said templates in a template library.

6. The method of claim 1, wherein said step of receiving said user specification of said database vendor, purpose and environment for said database is based on a selection from a list of existing databases.

7. The method of claim 6, wherein said step of receiving said user specification further comprises the step of presenting performance metrics for one or more existing database.

8. The method of claim 1, wherein said step of receiving a user selection of a storage profile further comprises the step of presenting said user with a list of available storage profiles.

9. The method of claim 1, wherein said step of receiving said user configuration of layout options is guided by one or more rule-based best practices.

10. The method of claim 1, further comprising the step of scrubbing said configured layout against one or more rule-based best practices.

11. The method of claim 1, wherein said database comprises one or more of a standalone database and a virtualized database.

12. A non-transitory machine-readable recordable storage medium for designing a layout for a database, wherein one or more software programs, when executed by one or more processing devices, implement the steps of the method of claim 1.

13. The method of claim 1, further comprising the step of repeating said determining step for a modification of one or more of said user specification, said user configuration and said user selection.

14. A system for designing a layout for a database, the system comprising:
   a memory; and
   at least one hardware device, coupled to the memory, operative to implement the following steps:
   receive a user specification of a database vendor, purpose and environment for said database;
   receive a configured layout from a user comprising a configured layout comprising a user configuration of layout options for said database to identify a predefined recommended layout for said given database vendor and said business data purpose;
   receive a user selection of a storage profile for said database;
   compare said configured layout and said predefined recommended layout to assign a target layout complexity factor indicating a degree of match between said configured layout and said predefined recommended layout;
   determine, using said at least one hardware device, a size and a product model for storing said database with said configured layout based on a quantitative profile factor assigned to said database vendor, said business data purpose and said environment by said at least one hardware device and a quantitative layout factor assigned to said protection type by said at least one hardware device, wherein one or more components of said quantitative profile factor are weighted by said target layout complexity factor; and provide said determined size and said determined product model for storing said database with said configured layout.

15. The system of claim 14, wherein said quantitative layout factor is based on whether specified file types need to be stored on one or more tiers of a tiered storage system.

16. The system of claim 14, wherein said at least one hardware device is further configured to present said user with results for said determined correct size and product model for storing said database with said configured layout.

17. The system of claim 14, wherein said at least one hardware device is further configured to generate one or more templates based on said configured layout.

18. The system of claim 17, wherein said at least one hardware device is further configured to store one or more of said templates in a template library.

19. The system of claim 14, wherein said user specification of said database vendor, purpose and environment for said database is based on a selection from a list of existing databases.

20. The system of claim 19, wherein said at least one hardware device is further configured to present performance metrics for one or more existing database.

21. The system of claim 14, wherein said user selection of a storage profile is based on a list of available storage profiles.

22. The system of claim 14, wherein said user configuration of layout options is guided by one or more rule-based best practices.

23. The system of claim 14, wherein said at least one hardware device is further configured to scrub said configured layout against one or more rule-based best practices.

24. The system of claim 14, wherein said database comprises one or more of a standalone database and a virtualized database.

25. The system of claim 14, wherein said at least one hardware device is further configured to repeat said determining step for a modification of one or more of said user specification, said user configuration and said user selection.

* * * * *